US012412390B2

(12) United States Patent
Buda et al.

(10) Patent No.: US 12,412,390 B2
(45) Date of Patent: Sep. 9, 2025

(54) SYSTEM AND METHOD FOR DETERMINING LOCATION AND ORIENTATION OF AN OBJECT IN A SPACE

(71) Applicant: CEPTION TECHNOLOGIES LTD., Jerusalem (IL)

(72) Inventors: Yossef Israel Buda, Kfar-Adumim (IL); Tal Israel, Mazkeret-Batya (IL)

(73) Assignee: CEPTION TECHNOLOGIES LTD., Jerusalem (IL)

( * ) Notice: Subject to any disclaimer, the term of this patent is extended or adjusted under 35 U.S.C. 154(b) by 215 days.

(21) Appl. No.: 17/600,597

(22) PCT Filed: Apr. 2, 2020

(86) PCT No.: PCT/IL2020/050401
§ 371 (c)(1),
(2) Date: Sep. 30, 2021

(87) PCT Pub. No.: WO2020/202158
PCT Pub. Date: Oct. 8, 2020

(65) Prior Publication Data
US 2022/0196432 A1    Jun. 23, 2022

(30) Foreign Application Priority Data
Apr. 3, 2019   (IL) .......................... 265818

(51) Int. Cl.
*G01C 21/00* (2006.01)
*G06V 20/00* (2022.01)
*G06V 20/20* (2022.01)

(52) U.S. Cl.
CPC .......... *G06V 20/20* (2022.01); *G01C 21/3841* (2020.08); *G01C 21/3852* (2020.08); *G06V 20/00* (2022.01)

(58) Field of Classification Search
CPC ............ G01C 21/3841; G01C 21/3852; G06T 2207/20081; G06T 2207/20084; G06T 2207/3024; G06T 2207/30252
See application file for complete search history.

(56) References Cited

U.S. PATENT DOCUMENTS 5,774,376 A * 6/1998 Manning ............. E02B 17/0034
702/56
5,884,296 A * 3/1999 Nakamura ......... H04N 1/40062
382/160

(Continued)

FOREIGN PATENT DOCUMENTS

CA        2678037 A1 *  9/2008 ......... G06K 9/00979
CN      119678124 A  *  3/2025 ............. G06F 3/167

(Continued)

OTHER PUBLICATIONS

"Monocular 3D Object Detection Using Feature Map Transformation: Towards Learning Perspective-Invariant Scene Representations;" Schroder et al., 2020 Fourth IEEE International Conference on Robotic Computing (IRC) (pp. 383-390); Nov. 1, 2020. (Year: 2020).*

(Continued)

*Primary Examiner* — Khoi H Tran
*Assistant Examiner* — Jorge O Peche
(74) *Attorney, Agent, or Firm* — AlphaPatent Associates Ltd.; Daniel J. Swirsky

(57) ABSTRACT

A system and method for determining location and/or orientation of a sensor may include, stored in a database a representation of an element in a first space. A mapping between the representation and input from a first sensor may be created. Using the mapping and input from a second sensor in a second space, one or more elements in the database may be identified. A location and/or orientation of (Continued)

the second sensor in the second space may be determined based on the one or more elements.

17 Claims, 4 Drawing Sheets

(56) References Cited

U.S. PATENT DOCUMENTS

| | | | | |
|---|---|---|---|---|
| 6,335,754 | B1* | 1/2002 | Endo | H04N 21/4334 |
| | | | | 348/36 |
| 6,950,120 | B1* | 9/2005 | Endo | G01C 11/02 |
| | | | | 348/36 |
| 8,548,197 | B2* | 10/2013 | Polle | G06T 7/246 |
| | | | | 382/103 |
| 9,098,754 | B1* | 8/2015 | Stout | G06T 7/70 |
| 10,366,445 | B2* | 7/2019 | Dhankhar | G06Q 30/0641 |
| 10,593,042 | B1* | 3/2020 | Douillard | G06V 20/64 |
| 10,733,482 | B1* | 8/2020 | Lee | G06T 7/74 |
| 10,809,361 | B2* | 10/2020 | Vallespi-Gonzalez | |
| | | | | G01S 7/4802 |
| 10,825,188 | B1* | 11/2020 | Tan | G06T 7/73 |
| 10,885,698 | B2* | 1/2021 | Muthler | G06T 15/005 |
| 11,073,842 | B1* | 7/2021 | Whitman | G06F 18/243 |
| 11,380,108 | B1* | 7/2022 | Cai | G06N 3/08 |
| 11,436,744 | B2* | 9/2022 | Kim | H04N 23/00 |
| 11,798,225 | B2* | 10/2023 | Saxena | G06T 17/05 |
| 11,866,167 | B2* | 1/2024 | Youmans | G06V 20/176 |
| 12,236,535 | B2* | 2/2025 | Kang | G02B 27/017 |
| 2002/0047901 | A1* | 4/2002 | Nobori | G06T 7/97 |
| | | | | 382/104 |
| 2004/0066316 | A1* | 4/2004 | Ogawa | G01C 21/3852 |
| | | | | 345/501 |
| 2004/0158366 | A1* | 8/2004 | Dieterle | G01C 21/26 |
| | | | | 701/410 |
| 2004/0169617 | A1* | 9/2004 | Yelton | G06T 15/005 |
| | | | | 345/1.1 |
| 2004/0169663 | A1* | 9/2004 | Bernier | G06T 15/04 |
| | | | | 345/629 |
| 2005/0190972 | A1* | 9/2005 | Thomas | H04N 5/2224 |
| | | | | 382/218 |
| 2010/0010741 | A1* | 1/2010 | Tener | G01C 21/005 |
| | | | | 701/500 |
| 2011/0110557 | A1* | 5/2011 | Clark | G01C 11/06 |
| | | | | 382/103 |
| 2013/0097197 | A1* | 4/2013 | Rincover | G01C 21/3664 |
| | | | | 707/E17.014 |
| 2013/0271607 | A1* | 10/2013 | Takahashi | H04N 7/18 |
| | | | | 348/148 |
| 2014/0333729 | A1* | 11/2014 | Pflug | G06T 15/50 |
| | | | | 348/47 |
| 2015/0015702 | A1* | 1/2015 | Yamaguchi | G06T 17/05 |
| | | | | 348/142 |
| 2015/0036870 | A1* | 2/2015 | Mundhenk | G06V 20/176 |
| | | | | 382/100 |
| 2015/0070394 | A1* | 3/2015 | Yanagawa | G06T 3/047 |
| | | | | 345/649 |
| 2015/0221079 | A1* | 8/2015 | Schultz | G01S 7/4808 |
| | | | | 382/190 |
| 2016/0092736 | A1* | 3/2016 | Mai | G06V 40/10 |
| | | | | 382/103 |
| 2016/0188996 | A1* | 6/2016 | Modica | G06F 16/50 |
| | | | | 382/203 |
| 2016/0275667 | A1* | 9/2016 | Modica | G01S 17/06 |
| 2016/0350927 | A1* | 12/2016 | Ma | G01C 21/30 |
| 2017/0061625 | A1* | 3/2017 | Estrada | G06N 3/04 |
| 2017/0169313 | A1* | 6/2017 | Choi | G06V 10/82 |
| 2017/0249774 | A1* | 8/2017 | Mullins | H04L 67/12 |
| 2017/0291611 | A1* | 10/2017 | Innes | B60W 40/09 |
| 2018/0033158 | A1* | 2/2018 | Campbell | G06F 3/0488 |
| 2018/0039862 | A1* | 2/2018 | Hyatt | G06T 7/73 |
| 2018/0137386 | A1* | 5/2018 | Cohen | G06F 18/2321 |
| 2018/0137858 | A1* | 5/2018 | Saxena | H04L 12/2816 |
| 2018/0150961 | A1* | 5/2018 | Senthamil | G06F 16/583 |
| 2018/0211403 | A1* | 7/2018 | Hotson | G06V 10/764 |
| 2018/0239991 | A1* | 8/2018 | Weller | G06F 16/907 |
| 2018/0247160 | A1* | 8/2018 | Rohani | G05D 1/0221 |
| 2018/0293439 | A1* | 10/2018 | Slesarev | G06T 7/11 |
| 2018/0322654 | A1* | 11/2018 | Chen | G06T 7/74 |
| 2018/0349746 | A1* | 12/2018 | Vallespi-Gonzalez | |
| | | | | G01S 7/4808 |
| 2019/0025854 | A1* | 1/2019 | Rohani | G06V 20/64 |
| 2019/0080142 | A1* | 3/2019 | Abeywardena | G06V 20/17 |
| 2019/0147600 | A1* | 5/2019 | Karasev | G06V 10/764 |
| | | | | 382/107 |
| 2019/0179327 | A1* | 6/2019 | Martin | G06V 20/58 |
| 2019/0180471 | A1* | 6/2019 | Mutschler | G06F 3/011 |
| 2019/0183077 | A1* | 6/2019 | Ajamian | G05D 1/12 |
| 2019/0213426 | A1* | 7/2019 | Chen | G06T 7/20 |
| 2019/0258878 | A1* | 8/2019 | Koivisto | G06V 10/774 |
| 2019/0259136 | A1* | 8/2019 | Shpalensky | G06T 7/70 |
| 2019/0265705 | A1* | 8/2019 | Zhang | G05D 1/0088 |
| 2019/0271550 | A1* | 9/2019 | Breed | G01C 21/3848 |
| 2019/0324148 | A1* | 10/2019 | Kim | G01S 17/42 |
| 2019/0340306 | A1* | 11/2019 | Harrison | G06T 15/506 |
| 2020/0020129 | A1* | 1/2020 | Chen | G06T 7/74 |
| 2020/0026282 | A1* | 1/2020 | Choe | G06T 7/50 |
| 2020/0060007 | A1* | 2/2020 | Harrison | H05B 47/105 |
| 2020/0162641 | A1* | 5/2020 | Thota | H04N 5/147 |
| 2020/0175326 | A1* | 6/2020 | Shen | G05D 1/2435 |
| 2020/0302231 | A1* | 9/2020 | Nawhal | G06F 18/211 |
| 2020/0324898 | A1* | 10/2020 | Youmans | G01C 21/005 |
| 2021/0150230 | A1* | 5/2021 | Smolyanskiy | G06V 10/82 |
| 2021/0287430 | A1* | 9/2021 | Li | G06V 10/776 |
| 2021/0331754 | A1* | 10/2021 | Whitman | G05D 1/0251 |
| 2021/0390777 | A1* | 12/2021 | Lopez Mendez | G06T 7/10 |
| 2022/0076443 | A1* | 3/2022 | Hincapie | G06T 7/73 |
| 2022/0196432 | A1* | 6/2022 | Buda | G01S 17/89 |
| 2022/0415059 | A1* | 12/2022 | Smolyanskiy | G06N 3/0464 |
| 2023/0046926 | A1* | 2/2023 | Saxena | G06T 17/05 |
| 2023/0061195 | A1* | 3/2023 | Quinton | G06F 16/50 |
| 2023/0116896 | A1* | 4/2023 | Hamilton | B25J 9/1666 |
| | | | | 701/50 |
| 2023/0150429 | A1* | 5/2023 | Slutsky | G06T 7/70 |
| | | | | 345/419 |
| 2023/0252667 | A1* | 8/2023 | Xu | G06V 10/462 |
| | | | | 382/100 |
| 2023/0292015 | A1* | 9/2023 | Hoch | G06V 20/10 |
| 2023/0343046 | A1* | 10/2023 | Canberk | G06F 3/167 |
| 2024/0064266 | A1* | 2/2024 | Hosangadi | H04N 5/272 |
| 2024/0362935 | A1* | 10/2024 | Mitrokhin | G06V 10/761 |
| 2024/0378799 | A1* | 11/2024 | Li | G06T 7/50 |
| 2024/0419907 | A1* | 12/2024 | Laprise | G01C 21/34 |
| 2025/0020481 | A1* | 1/2025 | Xie | G01C 21/3837 |
| 2025/0200283 | A1* | 6/2025 | Wu | G06V 20/00 |
| 2025/0218160 | A1* | 7/2025 | Wang | G06V 10/761 |

FOREIGN PATENT DOCUMENTS

| | | | | |
|---|---|---|---|---|
| WO | WO2019/000417 | | 1/2019 | |
| WO | WO-2019126387 A1 | * | 6/2019 | G06F 3/04815 |
| WO | WO-2019172941 A1 | * | 9/2019 | G01C 21/28 |
| WO | WO-2020202158 A1 | * | 10/2020 | G06V 20/20 |

OTHER PUBLICATIONS

"GenRadar: Self-supervised Probabilistic Camera Synthesis based on Radar Frequencies;" Carsten et al., ARXIV ID: 2107.08948; Jul. 19, 2021. (Year: 2021).*

"An Overview about Emerging Technologies of Autonomous Driving;" Huang et al., ARXIV ID: 2306. 13302; Jun. 23, 2023. (Year: 2023).*

International Search Report for PCT Application No. PCT/IL2020/050401 mailed Jul. 5, 2020.

Written Opinion of the International Searching Authority, dated Jul. 5, 2020, in patent application PCT/IL2020/050401.

Examination Report dated Dec. 18, 2024 from the Australian Patent Office in patent application AU 2020254128.

Letter dated Jan. 9, 2025 from the European Patent Office in patent application EP 20783452.4.

(56) References Cited

OTHER PUBLICATIONS

Letter dated Dec. 9, 2022 from the European Patent Office in patent application EP 20783452.4.
Office Action dated Sep. 14, 2021 in Israeli Patent Application No. IL 265818.
Office Action dated Jul. 31, 2022 in Israeli Patent Application No. IL 265818.
Machine Translation from Hebrew to English of the Rejections raised in the Office Action dated Sep. 14, 2021 in Israeli Patent Application No. IL 265818.
Machine Translation from Hebrew to English of the Rejections raised in the Office Action dated Jul. 31, 2022 in Israeli Patent Application No. IL 265818.

* cited by examiner

SYSTEM AND METHOD FOR DETERMINING LOCATION AND ORIENTATION OF AN OBJECT IN A SPACE

CROSS-REFERENCE TO RELATED APPLICATIONS

This application is a US National Phase Application of PCT International Patent Application No. PCT/IL2020/050401 International Filing Date Apr. 2, 2020, claiming the benefit of IL Patent Application No. 265818 filed Apr. 3, 2019, which is hereby incorporated by reference.

FIELD OF THE INVENTION

The present invention relates generally to determining location and orientation of an object in a space. More specifically, the present invention relates to determining location and orientation using data from a plurality of modalities.

BACKGROUND OF THE INVENTION

Systems and methods for determining a position or location of an object are known in the art, e.g., Global Positioning System (GPS) and Global Navigation Satellite Systems (GNSS). However, known systems and methods suffer from a number of drawbacks.

For example, the accuracy of known systems is limited to a few meters at best. Additionally, to function properly, known systems require continuous connection between at least two systems, e.g., between a smartphone and a number of satellites. Moreover, known systems and methods do not enable determining a location based on input from a sensor or modality other than a predefined modality. For example, a GPS system cannot determine a location based on images of objects in a space.

SUMMARY OF THE INVENTION

In some embodiments, a representation of an element in a first space may be created and stored in a database. A mapping between the representation and input from a first perception sensor may be created. Using the mapping, and input from a second sensor in a second space, one or more elements in the database may be identified, located or extracted and, using attributes of the one or more elements a location and/or orientation of the second perception sensor in the second space may be determined.

A first mapping may be according to a first condition and a second mapping may be according to a second condition. A mapping may be selected based on a condition related to a sensor. A representation of an element in the database may be based on a first point of view and input from a sensor may be from, or related to, a second, different point of view.

A plurality of mappings for a respective plurality of sensor types may be created. A mapping may be selected based on a type of a sensor. A subset of a set of elements in a database may be selected based on a type of a sensor. A representation of an element may be updated in a database based on input from a sensor. An element represented in a database may be sensed by at least one of: light signals, audio signals, heat, moisture level and electromagnetic waves.

An element in a database may be created based on at least one of: an image, a construction plan, a road map, a blue print, a satellite view, a street view, a top view, a side view an architectural plan and vector data. Information included or stored in the database may be related to, and the location and orientation of a sensor in a space may be determined according to, at least one of: a local coordinate system, a common coordinate system and a global coordinate system.

Information in a database for matching with input from a sensor may be selected based on received or calculated location information. An estimation of a location of a sensor in a space may be determined based on location information related to the sensor. An element may be created based on raw data received from a sensor.

An embodiment may include encoding data from a plurality of sources to produce a unified format representation of the data and including the unified format representation in the database. An embodiment may include utilizing machine learning to identify a set of elements in the database and matching the input with the set of elements. An embodiment may include determining location and orientation of a three dimensional (3D) space by: obtaining a 3D representation of the space using input from a mobile sensor; and determining a location and orientation of the space by correlating the 3D representation with a top view representation of the space.

An embodiment may include projecting a 3D representation on a top view representation. An embodiment may include receiving a set of images and using a relative location in at least some of the images to generate a 3D representation. A top view on which a 3D representation is projected may include at least one of: an aerial image, a satellite image, a structural map, a road map and a digital elevation model (DEM). A portion of a top view representation may be selected based on location information of a space.

A relative location of elements in a space may be determined based on at least one of: input from a sensor and processing a set of inputs having a respective set of points of view. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Figure 1:
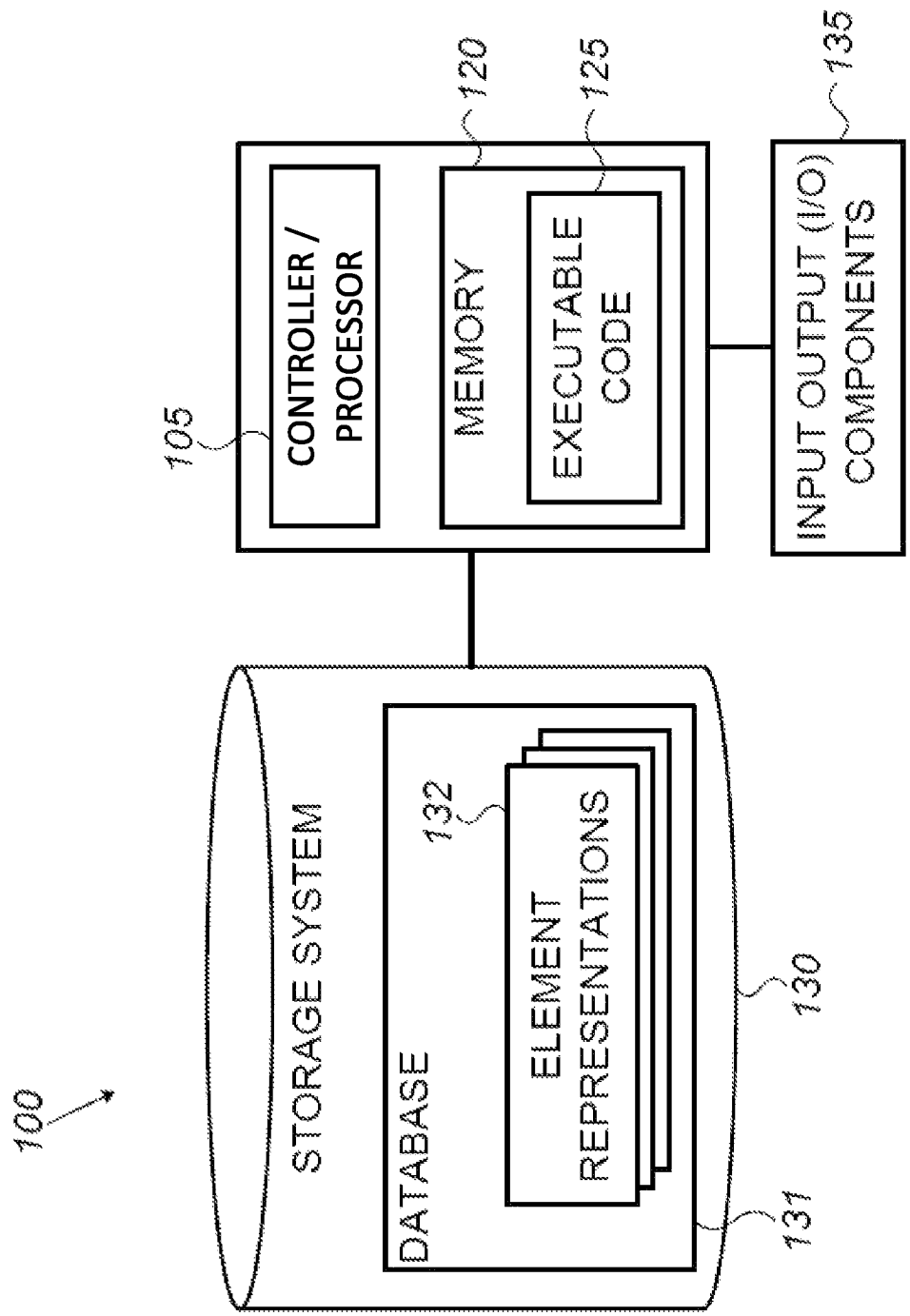
FIG. 1 shows a block diagram of a computing device according to illustrative embodiments of the present invention.

Reference is made to FIG. 1, showing a non-limiting, block diagram of a computing device or system 100 that may be used to determine location and/or orientation of a sensor (or a device connected to the sensor) according to some embodiments of the present invention. Computing device 100 may include a processor or controller 105 that may be a hardware controller. For example, computer hardware processor or hardware controller 105 may be, or may include, a central processing unit processor (CPU), a chip or any suitable computing or computational device. Computing system 100 may include a memory 120, executable code 125, a storage system 130 and input/output (I/O) components 135. Controller or processor 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. Memory 120 may be a computer or processor non-transitory readable medium, or a computer non-transitory memory device or storage medium, e.g., a RAM. Some embodiments may include a non-transitory storage medium having stored thereon instructions which when executed cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller or processor 105 possibly under control of an operating system. For example, executable code 125 may be an application that matches features or elements sensed by a sensor to element or features in a database as further described herein. Executable code 125 may be an application that identifies or extracts features or elements from a databases and associates the features or elements with signatures, identifiers or descriptions thus enabling a mapping between inputs from a variety of sensors and the features in the database.

Although, for the sake of clarity, a single item of executable code 125 is shown in FIG. 1, a system according to some embodiments of the invention may include a plurality of executable code segments similar to executable code 125 that may be loaded into memory 120 and cause controller or processor 105 to carry out methods described herein. For example, units or modules described herein, e.g., in a vehicle, drone or smartphone and/or in a server, may be, or may include, controller or processor 105, memory 120 and executable code 125.

Storage system 130 may be or may include, for example, a hard disk drive, a universal serial bus (USB) device or other suitable removable and/or fixed storage unit. As shown, storage system 130 may include a database 131 that may include element representations 132 (collectively referred to hereinafter as element representations 132 or individually as element representation 132 merely for simplicity purposes).

Objects in storage system 130, e.g., element representations 132 and other objects in database 131 may be any suitable digital data structure or construct or computer data objects that enables storing, retrieving and modifying values. For example, element representation objects 132 may be non-volatile memory segments, files, tables, entries or lists in database 131, and may include a number of fields that can be set or cleared, a plurality of parameters for which values can be set, a plurality of entries that may be modified and so on. For example, a location, color, shape, unique identification or signature of an object, element or feature represented by an element representation 132 may be set, cleared or modified in the element representation 132 that may be associated with the actual element in a space, region or location.

Attributes of an element (object or feature), e.g., included or described in an element representation 132, may be, or may include any relevant information. For example, attributes of an element may be, or may include, a location of the element, an orientation of the element in space, a color of the element, a temperature of the element, a size of the element, a shape of the element or any other characteristics of the element.

The phrase "element in a space" and term "element" as used herein may relate to any object, element or feature that can be sensed or identified by any sensor or modality. For example, an element (in a space) may be a house, a pole or a tree, e.g., sensed by a radar or a LIDAR system. In another example, an element can be a color of a wall, e.g., sensed by a camera. An element or feature can be, for example, a change of color, for example, if a first part of a wall is green and a second part of the wall is blue then the line separating the green part from the blue part may be a feature, e.g., sensed by a camera, as described. A color change feature may be recorded and used for determining a location as described. In yet another example, a temperature at a location can be a feature (e.g., sensed using an infrared (IR) sensor). Any object or phenomena in space may be an element as referred to herein. For the sake of simplicity, the term element will mainly be used herein, it will be understood that an element as referred to herein may mean, or relate to, any object or phenomena that can be sensed by any sensor.

Additionally, or alternatively, the term "element" may refer herein to features and elements that may not necessarily be directly perceived by a human observer and/or by any type of sensor. For example, as elaborated herein (e.g., in relation to FIG. 2), embodiments of the invention may include one or more AI engines (e.g., localization AI engine of FIG. 2), adapted to extract one or more elements (referred to herein as "location indicative elements") that may that may be characteristic, or defining of a geographical location, but nevertheless may not be associated with any specific physical object and/or may not be perceivable by a human observer and or by any type of sensor.

A unique identifier, reference or signature associated with an element, feature (or element representation 132) may be unique within a specific instantiation of the invention, but not be unique when compared with the universe of numbers of data stored on all existing computer systems. For example, a unique identifier, reference or signature associated with an element may be computed based on attributes of the element, including a location of the element as well as other attributes, thus, for each real or actual element in space, a unique identifier may be calculated.

Content may be loaded from storage system 130 into memory 120 where it may be processed by controller or processor 105. For example, element representations 132 may be loaded into memory 120 and used for matching them with input from a sensor as further described herein.

In some embodiments, some of the components shown in FIG. 1 may be omitted. For example, when computing device is installed in a vehicle, drone or smartphone, memory 120 may be a non-volatile memory having sufficient storage capacity and thus storage system 130 may not be required.

I/O components 135 may be used for connecting (e.g., via included ports) or they may include: a mouse; a keyboard; a touch screen or pad or any suitable input device. I/O components 135 may be or may be used for connecting, to computing device 100, devices or sensors such as a camera, a LIDAR, a radar, a heat sensing device, a microphone, an infra-red sensor or any other device or sensor. I/O components may include one or more screens, touchscreens, displays or monitors, speakers and/or any other suitable output devices. Any applicable I/O components may be connected to computing device 100 as shown by I/O components 135, for example, a wired or wireless network interface card (MC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include a server, for example, a web or other server computer, a network device, or any other suitable computing device.

Some embodiments of the invention may automatically and/or autonomously, create a representation, view and/or mapping of a space based on input from a set of different sensing devices. A representation, view and/or mapping of a space (and elements, features or objects therein) may be created, e.g., in database 131, by automatically creating element representations based on input from sensors of any type. A mapping between element representations and input from sensors may be automatically created. Accordingly, a system and method may automatically, based on input from a plurality of different sensors or modalities, create a representation, view and/or mapping of a space, e.g., such that objects or features in the space are usable for determining a location and/or orientation of a sensor. For example, after a mapping and representations are created, input from a sensor may be mapped to representations and the representations may be used to determine a location and/or orientation of the sensor.

Some embodiments of the invention may provide a positioning solution based on matching features or objects captured by perception sensors to features or objects represented in a database. Some embodiments of the invention may match an element as seen or captured, from/by a first point of view or first modality with an element or feature as seen/captured from/by a second point of view or modality. Accordingly, unlike known location or positioning systems and methods, embodiments of the invention are not limited to specific sensors, modalities or technologies.

For example, representations of elements, objects or features may be included in a database based on a top-view (e.g., satellite images) and these (representations of) elements, objects or features may be correlated or matched with elements, objects or features captured or seen using street-view images, e.g., captured by a camera in a vehicle. For example, elements in a top-view may be matched with elements in a ground surface view.

Some embodiments of the invention may enable using different sensor technologies without the need to collect new data. Additionally, some embodiments of the invention may be adapted to determine a location and orientation in various, different scenarios and/or conditions, e.g., different road condition, weather and visibility conditions.

As described, some embodiments of the invention may use auto encoding features to learn a correspondence or correlation between multiple instances of a scene, correspondence or correlation between multiple points of view and/or correspondence or correlation between representations of a scene by a plurality of modalities. The resulting system thereby learns localization features which are both discriminative or distinctive and invariant.

Figure 2:
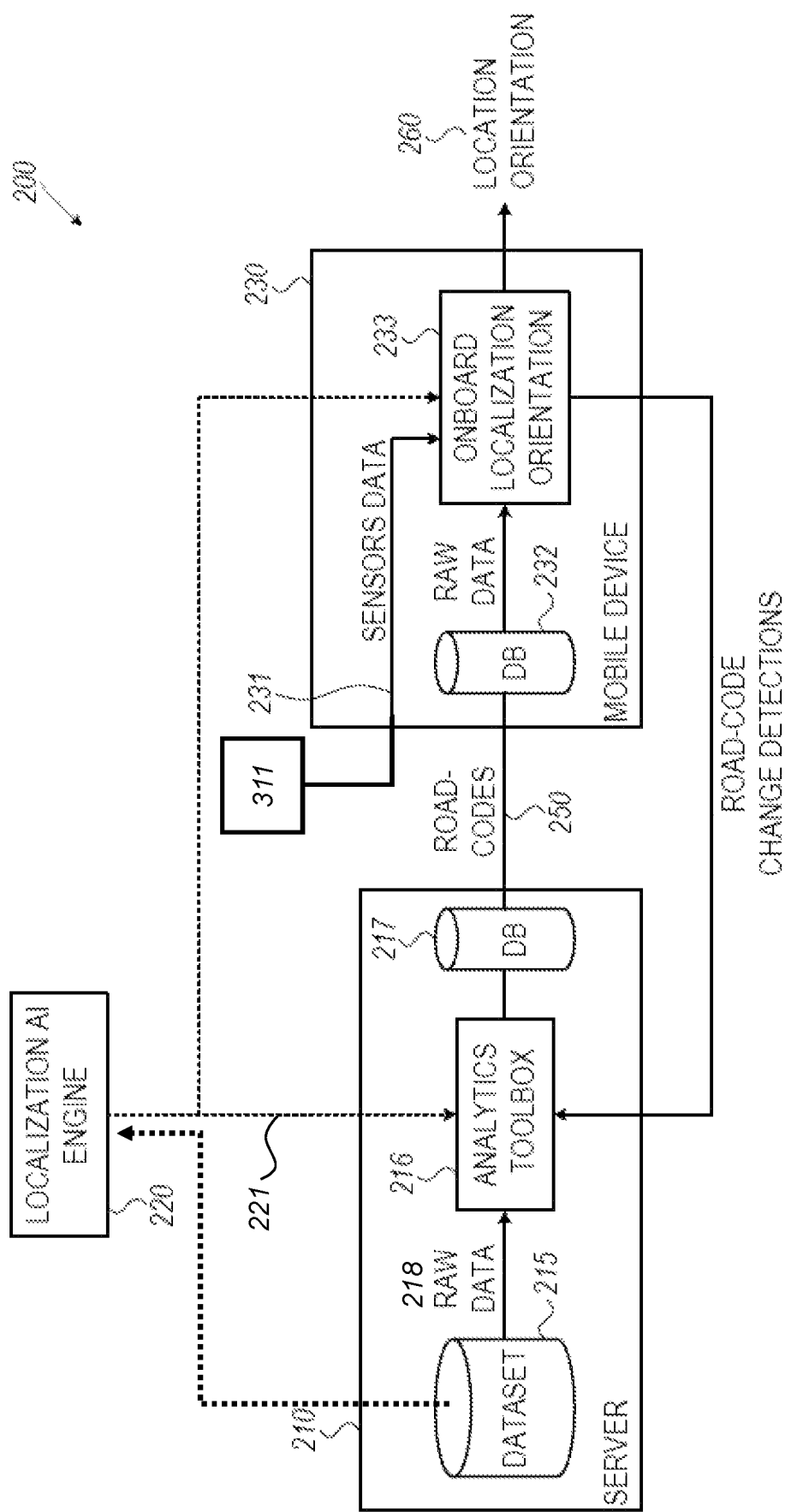
FIG. 2 is an overview of a system according to illustrative embodiments of the present invention.

Reference is made to FIG. 2, an overview of a system 200 and flows according to some embodiments of the present invention. As shown, a system 200 may generally include at least one server 210 and at least one mobile device 230. Server 210 may be, or may include one or more computing devices and/or modules that, for the sake of simplicity, will be referred to herein as server 210. As shown, server 210 may include a dataset 215, an analytics toolbox 216 and a database (DB) 217. As further shown, server 210 may include, or be operatively connected to, a localization artificial intelligence (AI) engine or unit 220.

Mobile device 230 may be a vehicle, a mobile computing device such as a smartphone or laptop, a drone or any other suitable computing device. As shown, mobile device 230 may include a DB 232 and an onboard localization and orientation (OLO) unit 233.

System 200 or components of system 200 may include components such as those shown in FIG. 1. For example, server 210, analytics toolbox 216 and AI unit 220 may be, or may include components of, computing device 100. Mobile device 230 and OLO unit 233 may be, or may include components of computing device 100. Although for the sake of clarity, a single mobile device 230 is shown in FIG. 2, it will be understood that a system 200 may include a large number of mobile devices 230. For example, server 210 may communicate with any (possibly very large) number of vehicles that may include the elements in mobile device 230.

According to some embodiments, system 200 may be scaled up by deploying a plurality of servers 210 that may be communicatively connected among themselves. Additionally, system 200 may be scaled up by including a large numbers of mobile devices 230.

As described herein, system 200 may be adapted to calculate, determine and/or provide (e.g., for a mobile device 230), an exact location and orientation (e.g., of mobile device 230) in space.

As shown in FIG. 2, input from one or more sensors included in, or connected to mobile device 230 may be received, as shown by sensor data 231. According to some embodiments, sensor data 231 may be matched, in real-time or near-real time, with information produced by server 210 and provided to mobile device 230. For example, information produced by server 210 and provided to mobile device 230 may be stored in DB 232. Generally, any data or information included in database 131 or 217 may be communicated to, and stored in, DB 232.

For example and as described herein, based on an estimation of a location of a vehicle, some of element representations 132 may be downloaded to DB 232 of a specific mobile device 230, such that DB 232 only stores element representations 132 that describe elements that are physically located near the specific mobile device 230.

The terms "real-time" (also referred to in the art as "real time") and "near-real time" as referred to herein may relate to processing or handling of events at the rate or pace that the events occur or received (possibly defined by human perception). For example, a system according to embodiments of the invention may match input from sensor 311 (that may be a mobile sensor) with at least one element representation 132, in real-time, e.g., within milliseconds or other very brief periods so that location and/or orientation of sensor 311 are made available or achieved virtually immediately.

Dataset 215 may include information from any system or source. For example, dataset 215 may include information extracted from images, construction plans, road maps, blue prints, architectural plans and vector data of elements in a region or space. Dataset 215 may include information extracted from satellite images or view, street view, top view and a side view of elements in a region or space.

AI unit 220 may use any method or system that includes artificial intelligence (AI) or machine learning (e.g., deep learning). Generally, machine learning (ML) or deep learning may relate to computerized systems or methods that perform a task without receiving or requiring specific instructions. For example, AI unit 220 may be a system that may be adapted to create at least one model 221 based on sample or training data. Analytics toolbox 216 may use the model 221 to make predictions or decisions without being explicitly programmed to perform the task of mapping input (e.g., from sensors 310 and 311) to element representations 132 as described.

A deep learning or AI model may use a neural network (NN). A NN may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

According to some embodiments, localization AI engine 220 may be adapted to create and/or train one or more ML models 221, such as deep-learning ML models, based on respective one or more sources of data. For example, localization AI engine 220 may receive (e.g., from dataset 215) data that may include, for example, images, construction plans, road maps, blue prints, architectural plans, aerial images or any vector data. Additionally or alternatively, localization AI engine 220 may receive data originating from one or more sensors (e.g., a camera, a radar, a LIDAR sensor, an infrared sensor, and the like) such as element 310 of FIG. 3. Localization AI engine 220 may be adapted to create or train a first ML model 221 corresponding to a first type of data (e.g., included in dataset 215) and produce a second ML model 221 corresponding to a second type of data (e.g., data originating from the one or more sensors).

According to some embodiments, localization AI engine 220 220 may be adapted to train at least one deep learning model 221, based for example on data in dataset 215. Model 221 may be adapted to identify or predict, as commonly referred to in the art, one or more features or elements that may be included in dataset 215.

For example, dataset 215 may include a plurality of data elements such as satellite and/or aerial photographs. AI engine 220 may produce a deep learning model 221 that may be or may include an autoencoder neural network. As known in the art, autoencoder neural networks may be trained so as to produce a compressed representation or an encoding of elements included in an input dataset. Thus, in a training stage, AI engine 220 may use a subset of the aerial photograph data elements as a training subset, to train model 221 so as to produce a representation 132 (e.g., compressed representation) or encoding of one or more elements (e.g., tree, houses, etc.) included in the training subset. In a subsequent inference stage, AI engine 220 may produce a compressed representation 132 or encoding of one or more elements (e.g., houses, poles, trees, etc.), that may be included in data elements (e.g., element 218) of dataset 215 beyond the training subset. Additionally, or alternatively, in the inference stage, AI engine 220 may identify one or more elements or features (e.g., houses, poles, etc.) that may be included in data elements (e.g., element 218) of dataset 215 beyond the training subset.

In another example, dataset 215 may include a plurality of data elements that may originate from sensors (e.g., element 310 of FIG. 3) that may be located at ground level, including for example, cameras, LIDAR sensors, radar sensors, etc. AI engine 220 may use a subset of the plurality of sensor (e.g., 310) data elements as a training subset, to train model 221 so as to produce a representation 132 (e.g., a compressed representation) or encoding of one or more elements or features (e.g., trees, cars, houses, etc.) that may be included in data elements (e.g., element 231, element 218, data of sensor 310) beyond the training subset.

According to some embodiments of the invention, one or more (e.g., each) data element 218 of dataset 215 may be associated with a geographical position and/or orientation. For example, a data element 218 may be an aerial photograph, and may include, or may be associated with a location or position and/or an orientation at which the photograph was taken. In another example, a data element 218 may be an architectural plan (e.g., of a house, a constructed monument, and the like), and may be associated with a geographical location of a respective constructed element. In yet another example, a data element 218 of dataset 215 may originate from a sensor (e.g., an image of radar) and may include or be associated with a location at which the respective sensor data was obtained.

According to some embodiments, localization AI engine 220 may be configured to produce at least one ML model 221, adapted to predict one or more elements 320 or features that may be included in raw data 218 and may best correspond to geographical location. It may be appreciated by a person skilled in the art that such elements may not necessarily correspond to actual, physical elements (e.g., a house, a pole) that may, for example, be perceived by a human eye. In some cases, such elements may be regarded as incoherent or amorphous by a human observer. Such elements are herein referred to as "location indicative" elements (e.g., element 325 of FIG. 3). For example, embodiments of localization AI engine 220 may extract at least one location indicative element 325, that may be or may include a combination (e.g., a numerical combination, such as a weighted sum) of a first number (e.g., representing the color of the sky) and a second number (e.g., representing a pattern of vegetation). Localization AI engine 220 may use the extracted at least one location indicative element 325 as a characteristic or an indicator of a geographical location (e.g., indicate whether an image has been taken in a mountainous environment or in a desert).

Using the at least one model 221, analytics toolbox 216 may create representations, descriptions and/or identifications of features and/or elements in a region or space. In other words, analytics toolbox 216 may perform inference of the at least one model 221 on a plurality of data elements.

Pertaining to the example of aerial images, analytics toolbox 216 may perform inference of at least one model 221 on one or more aerial images originating, for example from dataset 215 (e.g., data element 218), and may map or associate at least one representation, description and/or identification (e.g., a label of an identified object, such as a house) with a respective elements included in the aerial images.

In another example, analytics toolbox 216 may receive a model 221, adapted to analyze a specific type of input data, such as satellite images. In such embodiments, model 221 may have been trained on a first set of satellite images taken over one or more first locations, and adapted to identify objects (e.g., road signs, buildings) in the images. Analytics toolbox 216 may infer model 221 on one or more satellite images (e.g., data elements 218) of dataset 215, taken over one or more second locations, to identify objects in the one or more second locations. As elaborated herein, data elements 218 may be associated with specific geographical locations. Therefore, analytics toolbox 216 may produce one or more element representations 132 corresponding to the one or more identified objects (e.g., road signs, buildings, etc.), and the one or more element representations 132 may be associated with the specific geographical locations. Said element representations 132 associated with specific geographical locations may herein be referred to as road codes (e.g., element 250).

Figure 3:
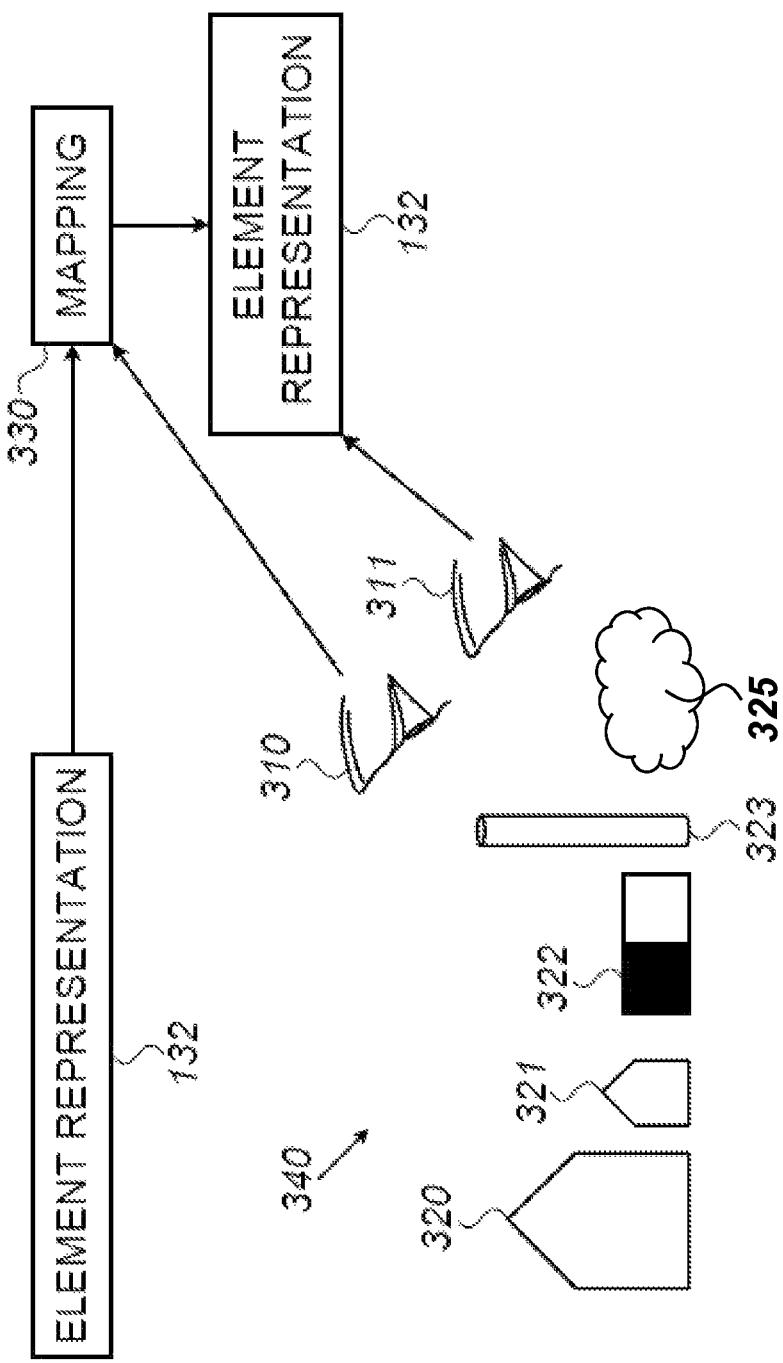
FIG. 3 is an overview of a system and flow according to illustrative embodiments of the present invention.

In yet another example, localization AI engine 220 may produce an ML model 221 that may be adapted to receive at least one input data element of a specific type or modality, such as a specific type of sensor (e.g., element 310 of FIG. 3). ML model 221 may be adapted to extract or predict from the at least one received data element one or more location indicative elements 320, as elaborated herein. Analytics toolbox 216 may be configured to receive at least one data element, such as data element 218 from dataset 215, that may correspond to the same specific type or modality. Analytics toolbox 216 may use ML model 221 to extract at least one location indicative element 325 that may be included in input data element 218, and may be a characteristic of a geographical location. As elaborated herein, data element 218 may be associated with a geographical location or position. Therefore, analytics toolbox 216 may create an element representation 132 that may also be associated with the same geographical position. In other words, analysis toolbox 216 may produce, from the incoming data element 218 at least one road code 250 that may be associated with an location indicative element 325, based on ML module 221.

The term "mapping" may refer herein to an association of a label or a representation of an element 132 with one or more data elements (e.g., one or more images and/or one or more portions thereof) that may be, for example, included in dataset 215 and/or obtained from a sensor (e.g., element 310 of FIG. 3).

According to some embodiments, analytics toolbox 216 may update DB 217 so as to include said mapping or association between element representations and corresponding input data (e.g., 218 and/or data of sensor 310).

In some embodiments, one or more representations, descriptions and/or identifications of features and/or elements may be provided to mobile device 230. For example, and as shown in FIG. 2, mobile device 230 may receive one or more road codes 250, and may be stored in DB 232.

According to some embodiments, OLO unit 233 may extract road-codes 250 and/or other representations, descriptions and/or identifications of features and/or elements from DB 232, match or correlate them with sensor data 231 (produced by sensors in mobile device 230) and, based on the matching, determine its location and/or orientation 260 in relation to the relevant representations. Location and orientation 260 may be presented to a user, e.g., using a screen, speakers and the like.

As shown by the arrow connecting OLO unit 233 and analytics toolbox 216, OLO unit 233 may update analytics toolbox 216, e.g., to remove an element that is no longer present in a region, add an element that is missing in DB 217, modify a description of an object and the like.

Reference is additionally made to FIG. 3 which shows components and flow according to some embodiments of the invention. As shown, an element representation 132 and input from a first sensor 310 may be used to create a mapping 330 between the input and the representation. As further shown, using the mapping 330, input from a second sensor 311 may be matched with the element description 132. Sensors 310 and 311 may for example be mobile sensors, e.g., installed in a car, aircraft, ship or bike or hand carried by a user, e.g., included in a smartphone.

Additionally, or alternatively, at least one sensor 310 may be adapted to obtain at least one input data element that may pertain to at least one location indicative element 325. As elaborated herein, location indicative element 325 may not pertain to any specific physical object (such as house 320 or pole 323), but may be a produce of ML model 221. According to some embodiments, location indicative element 325 may be unintelligible or incoherent to a human observer, but may be recognized by localization AI engine 220 as indicative of geographical locations. In such embodiments, analytics toolbox 216 may perform mapping between a representation 132 of location indicative element 325, and the input data of the at least one sensor 310.

Mapping 330 may be, or may include any information or logic that, provided with input from a sensor, produces at least one value, indication, pointer or reference that enables identifying, locating or extracting, at least one element representation 132 from a database. Otherwise described, mapping 330 may be, or may be viewed as, a conversion unit, data or logic that converts input from a sensor to an element representation 132 object.

For example, a first sensor (e.g., element 311, such as a radar) may be adapted to sense an object (e.g., element 323, such as a pole). First sensor 311 may be adapted to subsequently output a signal or a data element corresponding to the sensed object. In the example of the pole, first sensor 311 (e.g., the radar) may produce one or more or more signals or data elements that correspond to one or more (e.g., a set of) values or readings that represent a frequency, an amplitude or other attributes of RF radiation or electromagnetic waves, reflected from pole 323. The set of values may be mapped to, or associated with, an element representation object 132, accordingly, when the set of values is received at a later stage (e.g., by another radar sensor 311), the mapping or association can be used to map the values to the element representation 132 object of pole 323.

As described, mapping 330 may generate a signature based on a set of values received from a sensor as described and the signature may be used for finding the correct element representation 132 object, the signature may be used as a key for finding an element representation 132 object in a database, e.g., in DB 232. For example, OLO 233 may examine sensor data 231 (input from a sensor), calculate or produce a signature based on the input and use the signature to find an element representation 132 object in DB 232. Once an element representation 132 object is found, attributes such as the location of the element may be extracted from the element representation 132 object.

For example, an element in space 340 may be a corner of a house 320, a house 321, a pole or tree 323 or a change of color 322, e.g., element or feature 322 may be a line separating a white part of a wall from a black part. Elements, objects or features 320, 321, 322, 323 and 325 may be represented in database 131 using element representations 132. Element representations 132 may include representations or encoding of elements that may originate from AI model 221. For example, AI model 221 may be or may include an autoencoder model, having a bottleneck hidden layer, which may be adapted to produce a representation (e.g., a compressed representation) or encoding of elements included in an input data set. 132.

Generally, an element representation 132 may include any metadata related to an element, object or feature. The terms element, object and features as referred to herein may mean the same thing and may be used interchangeably herein. For example, an element representation 132 may include a location (e.g., using coordinate values as known in the art), a color, a size, a shape and the like. For example, an element representation 132 of house 321 may include the house's location, an element representation 132 of pole 323 may include the pole's height and an element representation 132 of color change 322 may include the location and length of a line that separates two colors on a wall as well as an indication of the two colors.

Generally, a coordinate system enables using values to represent a location and/or orientation in a space. For example, coordinates in a Cartesian coordinate system are tuples that represent a location of a point in space. A coordinate system may be standard or global, e.g., known and used by various systems and methods or it can be a relative one. For example, a relative coordinate system may represent a location of an element in space with respect to sensor 311, e.g., a relative coordinate system may be used to indicate the location of house corner 320 with respect to sensor 311, e.g., the origin (e.g., the point 0,0,0) of a relative coordinate system may be sensor 311 such that the relative locations of pole 323 and house 321 are represented with respect to the location of sensor 311.

It is noted that the point of view of sensor 310 may be different from the point of view of sensor 311, for example, sensor 310 may be installed on a rod extending from a roof of a car traveling from north to south near house 321 and sensor 311 may be placed on a bumper of a car traveling in the opposite direction near house 321, as described, an element representation 132 of an element in a database may be based on a point of view (or modality or sensor) that is different from the point of view, sensor type or modality of sensors 310 and 311, accordingly, embodiments of the invention enable matching representations of elements that are derived using different modalities, input types or sensors types. Accordingly, sensors (e.g., sensors 310 and 311) may be installed in different vehicles or in different stationary objects.

In some embodiments, a method of determining location and orientation of a sensor may include storing or including, in a database, a representation of an element in a first space and creating a mapping or correlation between the representation and input from a first perception sensor (e.g., sensor 310). For example, based on a satellite image, a representation 132 of house 321 seen in the satellite image, may be included as an element representation 132 in database 217 (e.g., element 131 of FIG. 1), thus forming a representation of an element in a first space. Subsequently, input from a camera (first perception sensor, e.g., sensor 310), e.g., in a vehicle traveling by house 321, may be received (forming the representation and input from a first perception sensor). An embodiment may examine the image, identify house 321 therein and define a mapping (e.g., mapping 330) between the image representation of house 321 in the image and the element representation 132 in database 217 (e.g., 131) which describes house 321. It will be noted that a sensor that is a conventional (visible light) camera and that produces an image is just one of the types of applicable sensors. For example, sensor 310 may be a LIDAR device, a radar, a heat sensing device, a microphone, an infra-red (IR) sensor and the like.

Processing and operations described herein may be performed by a server (e.g., server 210) and/or by a unit in a vehicle (e.g., OLO 233) or a server and a unit in a vehicle may collaborate in performing methods described herein. For example, server 210 may include in a database a representation of an element in a first space, e.g., in the form of an element representation object 132 and the server may further create a mapping 330 between the representation and input from a sensor (e.g., 310) and provide the mapping to OLO 233 which may use the mapping and input from a second perception sensor (e.g., 311) to identify one or more elements in a database (e.g., in DB 232) and use attributes of elements identified in the database to determine a location and/or orientation of mobile device (e.g., vehicle) 230.

It is noted that, e.g., in the above example involving a camera, once a mapping 330 is created as described, any image of house 321 captured by practically any camera or image acquisition device may be mapped to the element representation 132 of house 321 in database 131 (e.g., element 217 and/or element 232). For example, one or more attributes of house 321 such as size, shape, height, color, contours and the like may be taken into account when creating or defining mapping 330, such that any image of house 321 may be mapped, using mapping 330, to the correct element representation 132 in database 131 (e.g., element 217 and/or element 232), that is, to the specific element representation 132 that describes house 321.

It may be appreciated that although the example of a house (e.g., elements 320, 321) is used ubiquitously herein, similar logic may be applied to any other physical feature or element (e.g., color change 322, pole 323), or on non-physical elements, such as location indicative element 325.

In some embodiments, a method of determining location and orientation of a sensor may include using a mapping and input from a second perception sensor, in a second space, to locate or identify one or more elements in the database. For example, using mapping 330, input from sensor 311 (second sensor) may be used to locate or identify house 321 in DB 232. For example, an image of house 321, as captured by sensor 311 (that may be a camera or other sensing device) may be processed using mapping 330 to produce a result that may be used to locate element representation 132 that describes house 321, in database 131 or in DB 232.

In some embodiments, a method of determining location and/or orientation of a sensor may include using attributes of identified (e.g., in a database) one or more elements to determine a location and orientation of the second perception sensor in the second space. For example, provided with an image of house 321 captured by sensor 311 (the second sensor) and using mapping 330, OLO unit 233 may produce a reference, key or signature that can be used for extracting, from DB 232, the element representation 132 object that describes house 321.

As described, the element representation 132 object that describes house 321 may include any metadata or attribute, e.g., an attribute or metadata in the element representation 132 object may be the exact location of house 321 in the form of coordinates values in a global or known coordinate system. Accordingly, exact locations of elements 320, 321, 322, 323 and 325 may be obtained by OLO unit 233 thus, e.g., using triangulation, OLO unit 233 may accurately determine its location and/or orientation.

In some embodiments, a method of determining location and orientation of a sensor may include creating a first mapping according to a first condition and creating a second mapping according to a second condition and selecting to use one of the first and second mappings according to a condition.

For example, sensor 310 may be used to sense house 321 in daylight and then at night and two mappings 330 may be created, one to be used during the day and another for night time. Similarly, mappings 330 may be created for summer, winter, storm, specific dates, time of day and so on. Similarly, a first mapping 330 of input from sensor 311 when sensing pole 323 on a rainy day to an element representation 132 object may be created and a second mapping, to the same element representation 132 may be created for input from sensor 311 when sensing pole 323 on a sunny day. Accordingly, a mapping may be based on a condition, time of day, date and so on. As described, based on a condition, a mapping may be used, e.g., if pole 323 is sensed or "seen" by sensor 311 during day time then the day time mapping may be used and, if the pole is sensed by sensor 311 during the night (thus input from sensor 311 may be different) then a night mapping may be selected. Accordingly, a mapping may be created and dynamically selected based on a condition. For example, OLO 233 may select a first mapping if the weather is fine and a second mapping in a storm, e.g., OLO 233 may select a first mapping in a first condition (e.g., cold weather or rainy day) and select a second mapping in a second condition (e.g., warm weather or sunny day).

In some embodiments, elements (e.g., element representations 132) may be classified. For example, element representations 132 may be classified according to a suitability for sensor type (e.g., a first class of elements may be suitable for use with a camera and a second class of elements may be suitable for use with a LIDAR sensor or device). Element representations 132 may be classified according to a condition, e.g., elements best detected at night may be associated with a first class and elements best detected in sunlight may be associated with a second class. Similarly, classification of elements may be according to weather conditions, location (e.g., elements in a tunnel may be classified differently from elements in a farm and so on. Any aspect or condition may be used for classifying elements. Accordingly, an embodiment can automatically select a set of elements to be used for determining location and/or orientation based on any condition or aspect. For example, if it rains when location of sensor 311 is to be determined then a set of elements classified as best for poor visibility may be selected and used as described herein for determining the location and/or orientation of sensor 311.

In some embodiments, a representation 132 of an element in database 131 may be based on, or related to, a first point of view and input from a sensor for which location and orientation is determined is related to a second, different point of view.

For example, a first point of view may be used for creating mapping 330 and a second, different point of view may be used for determining location and orientation of a sensor. For example, the point of view of sensor 310, when sensing house 321 to create mapping 330 as described, may be different from the point of view of sensor 311 when its location and orientation are determined based on identifying house 321 as described.

In some embodiments, a plurality of mappings 330 may be created for a respective plurality of sensor types or modalities. In some embodiments, a method of determining location and orientation of a sensor may include selecting one of a plurality of mappings 330 based on the type of the sensor.

For example, in a first case, mobile device 230 may inform server 210 that it includes a camera (sensor type), in response, server 210 may search database 131 or DB 217 for elements or features that can be sensed by a camera, e.g., colors, road signs and the like. Next, server 210 may send to mobile device 230 (e.g., as road codes element 250) the mappings for the selected elements, e.g., the mapping 330 of color change 322 may be downloaded to mobile device 230 since it's best suited for sensing by a camera. In a second case, mobile device 230 informs server 210 that it includes a LIDAR system, in this case, server 210 may send mapping 330 for pole 323 but avoid sending the mapping for feature 322 since a change of color on a surface cannot be accurately sensed by a LIDAR.

Accordingly, an embodiment may create a plurality of mappings 330 for a respective plurality of sensor types and automatically or dynamically select a mapping to be used based on the type of sensor for which location and/or orientation are determined, an embodiment may further dynamically or automatically select a subset of elements in a database, wherein the subset selected based on the type of the second sensor, that is, both mappings and element representations 132 may be selected such that the set of element representations 132 and mappings 330 downloaded to DB 232 is the optimal set for the sensor used. Of course, if mobile device includes a number of different sensors or different types of sensors (e.g., camera and LIDAR) then element representations 132 and mappings 330 for both camera and LIDAR may be automatically selected and downloaded to mobile device 230 as described.

Accordingly, embodiments of the invention may select, from a large set, a subset of element representations 132 and mappings 330 based on a location of a sensor and based on attributes of the sensor, e.g., the sensor type and/or suitability of the sensor to sense different or specific elements in the vicinity of the sensor. As described, the set may also be selected based on a condition.

In some embodiments, an element representation 132 in one or more of database 131, DB 217 and DB 232 may be updated based on input from a sensor. For example, starting from a satellite image, a plurality of circles may be identified, and their respective diameters and locations may be included in their respective element representations 132. Next, an image may reveal that the circles are the top surfaces of poles, in such case, the element representations 132 already in database 131 may be updated to reflect the fact that the elements or poles. Any metadata related to an element or feature may be updated, or modified as described. For example, in the above example of poles, updating the element representations 132 may include indicating which sensors can sense them, in what conditions the elements can be sensed and so on.

In some embodiments, e.g., if input from sensor 311 cannot be mapped to any element representation 132, a new element representation 132 may be created in database 131. For example, if pole 323 was recently placed by a road then input from the first sensor 310 that passes by pole 323 may cause controller or processor 105 to add a new element representation 132 to database 131. As described, input from additional sensors passing by pole 323 may be used to verify that pole 323 is present and/or map the element representation 132 of pole 323 to other sensor types as described.

Element representations 132 may be removed from database 131. For example, after pole 323 is removed from the road side, sensor 311 does not sense it when passing where pole 323 was placed, by comparing input from sensor 311 to data in DB 232, controller or processor 105 may identify that pole 323 is no longer sensed and may remove the relevant element representation 132 from all databases in system 200. Accordingly, embodiments of the invention continuously and autonomously update a representation of space such that it truly reflects the current state of the space.

The advantages of automatically and autonomously creating digital representations of elements, objects or features as described may be appreciated by those having ordinary skill in the art. For example, assuming a new sensor, e.g., an IR sensor, is introduced to the field or market, e.g., input from such a type of IR sensor has never been received by system 200. When first receiving input from the new IR sensor, system 200 may automatically create element representations 132 based on the input. An embodiment may then create a mapping between features, elements or objects sensed by IR sensors and element representations 132, e.g., during a training session. An embodiment may associate or map element representations 132 created based in IR sensors with other elements in a database such that information related to a newly introduced sensor are identified and characterized using input from other sensors and/or input from other sources, e.g., maps and the like. As described, element representations 132 added may be used to determine a location and/or orientation of IR sensors. Accordingly, a system and method need not be configured or modified in order to adapt to new sensor types, rather, systems and methods of the invention can automatically adapt to newly introduced sensors or modalities.

A versatility with respect to sensor types or modalities provided by embodiments of the invention cannot be provided by known systems and methods. The versatility with respect to sensor types or modalities is an improvement current or known systems and methods which are restricted to specific sensors or modalities. For example, sensor 311 may be a microphone and the sound of a power generator in a factory (e.g., intensity and frequency) may be used for creating an element representation 132 object that may be used to determine location and/or orientation as described. Similarly, any phenomena that can be sensed by any sensing device may be represented by an element representation 132 in database 131 and used as described, e.g., element representations 132 objects may be created and/or updated based on optical data, acoustical data and radio frequency data.

By supporting any modality or sensor type as described, embodiments of the invention improve the field of location sensing or determination by providing scalability and configurability that cannot be provided by known systems or methods. For example, a user who just added a LIDAR system to his car can immediately receive location and/or orientation information based on the newly added LIDAR system and based on element representations 132 that are relevant to LIDAR systems, e.g., based on element representations 132 and a mapping that were previously created or updated based on input from LIDAR systems. A system and method may be trained to support any sensor type or modality as described. It will be noted that once a system is trained to use a specific sensor or modality, it may be used to determine a location and/or orientation of a sensor even in places or spaces where no input from the specific sensor type was received, e.g., using a mapping as described, any object in any space may be identified as described.

Generally, an element or feature as referred to herein may be any object, element or feature that can be sensed by any sensor or modality, e.g., an element or feature may be sensed by, or based on, a light signal, an audio signal, temperature or heat, moisture level, electromagnetic waves or any other phenomena that can be sensed. For example, moisture near a carwash place or water park may be sensed, heat from a white wall (as oppose to heat from a black wall) may be sensed and so on. For example, a first element representation 132 may describe an object sensed by sonar, a second element representation 132 may describe an object sensed based on heat (e.g., using IR) and so on.

Element representations 132 may be created based on any source, modality or type of data, e.g., they may be created based on an images, construction plans, road maps, blue prints, architectural plans, aerial images or any vector data. For example, element representations 132 may be created, e.g., by server 210, based on a satellite image or view, a street view footage or images, a top view and a side view all of which may be obtained by server 210 from any source, e.g., the internet, authorities and so on. Accordingly, any modality (and, as described, any data from any point of view) may be used for creating element representations 132. For example, an element representation 132 in database 131, related to an object in space may be created based on a mark in a map, may then be updated based on an image of the object, then updated based on input from a LIDAR device and so on. As described, element representations 132 in database 131 may be found, identified and/or retrieved based on input from a sensor (of any type) using a mapping as described.

In some embodiments, a global or common coordinate system may be used. For example, as described, an element representation 132 may include location information in the form of coordinates in a first coordinate system, in case a second, different coordinate system is used by mobile device 230, an embodiment may convert or transform location information such that it is presented to a user according to a preferred or selected coordinate system. In some embodiments, an element representation 132 may include location information (e.g., coordinates) related to one or more coordinate systems, e.g., related to a global coordinate system and a number of different local coordinate systems, in other embodiments, a conversion logic may be used to translate or transform location information as required.

In some embodiments, the information in a database that is matched with input from a sensor as described is selected based on received or calculated location information. In some embodiments, an estimation of a location of the sensor in a space, area or region is determined based on location information related to the sensor. For example, based on GPS data, a cellular tower's location information or Wi-Fi access points identifications, at list the area where sensor 311 is in may be determined and server 210 may select to download to DB 232 elements in the area. Accordingly, only relevant elements in a space or region may need to be stored by mobile device 230 thus eliminating the need of mobile device 230 to store, and search through, large amounts of data.

In some embodiments, mapping 330 may map or correlate any input from a sensor to an element representation 132, e.g., raw data received from sensor 311 when sensing corner 320 may be processed using mapping 330 to produce a signature, pointer or reference that can be used to identify the element representation 132 that describes corner 320.

In some embodiments, data received from a plurality of sources, e.g., a plurality of sensor types, may be encoded to produce a unified format representation of the data and the unified format representation may be included in the database, e.g., in one or more element representations 132. By encoding different data types coming from different sensor types into a unified format representation, an embodiment can represent a single element or feature in space based on input from a plurality of different modalities. For example, an element representation 132 may be created based on a map (first source) and a satellite image (first modality) and based on input from a mobile sensor such as a mobile camera (second modality), such creation of an element representation 132 based on input from a plurality of sources, sensor types and modalities may be done using a unified format representation. In some embodiments, a unit (not shown) connected to a sensor in mobile device 230 may convert raw data received, e.g., from sensor 311, to a unified format representation (that may be included in, or associated with, element representations 132, e.g., in the form of metadata as described), thus, efficiency of a search in DB 232 for an element representation 132 is improved and speed of operations described herein is increased.

Adapted to use input from any type of sensor, embodiments of the invention improve the technology which is currently confined to a limited, preconfigured set of sensors or modalities, embodiment of the invention provide a practical application of a process for determining a location and/or orientation of a sensor (or vehicle or other entity that includes the sensor), for example, a practical application of such process includes OLO 233, DB 232 and at least one sensor 311 installed in a car such that a system can provide the driver with his or her location based on input from a variety of sensors that may be of any type or modality.

In some embodiments machine learning may be used to match input from a sensor with elements. For example, an iterative learning process may include examining a set of inputs, from one or more sensors, related to an object and generating a model that, given input of a sensor sensing the object maps the input to an element representation 132 that is associated with the object.

Figure 4:
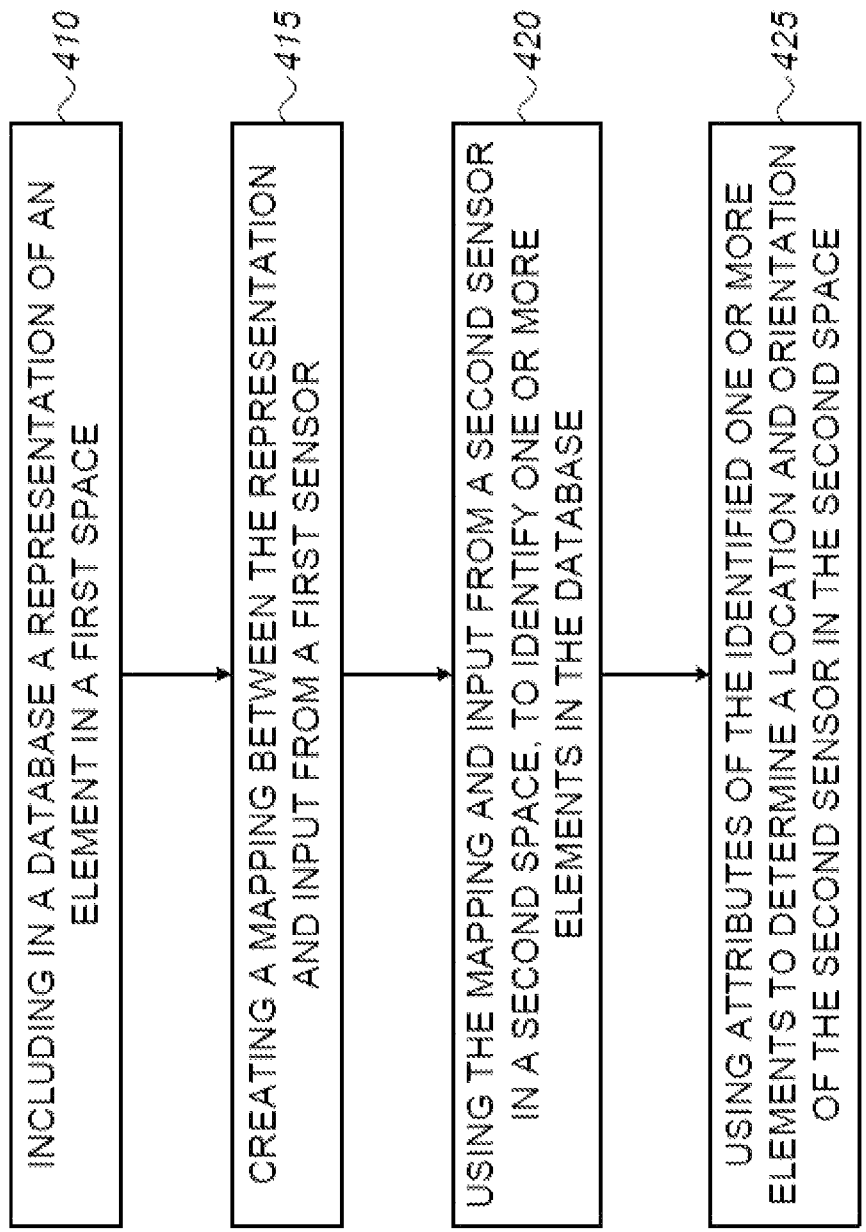
FIG. 4 shows a flowchart of a method according to illustrative embodiments of the present invention.

Reference is made to FIG. 4, a flowchart of a method according to illustrative embodiments of the present invention. As shown by block 410, a representation of an element may be included in a database. For example, a plurality of element representations 132 may be included in database 131. As shown by block 415, a mapping between the representation and input from a first sensor may be created. For example, based on input from sensor 310, when sensing pole 323, an embodiment may create a mapping 330 such that, using the mapping, input from a sensor near pole 323 is mapped to an element representation 132 that describes pole 323.

As shown by block 420, the mapping may be used to map input from a second sensor, in a second space, to identify one or more elements in a database. It will be noted that the first and second sensors may be of the same type, or they may be of different types. The first and second spaces may be the same space in different times or they may be different spaces. For example, if a mapping enables identifying pole 323 in DB 232 then similar or identical poles (in another place or space) may be identified using the mapping created for pole 323. As shown by block 425, using attributes of the identified one or more elements, a location and/or orientation of a sensor may be calculated and/or determined. For example, by identifying a number of elements around sensor 311 as described, the exact locations of these elements may be known (e.g., since it may be included in their respective element representation 132 objects) thus the location of sensor 311 may be determined, either globally or with respect to the identified elements. For example, a location provided to a user by an embodiment may be in the form of coordinate values and/or in the form of an indication of the location on a map, e.g., as done by navigation systems. An orientation provided to a user may be in the form of an image or avatar (e.g., of a car) where the image or avatar is shown, on a map, such that the orientation (e.g., direction of movement) are clearly shown.

Some embodiments may continuously update, add and/or remove element representations 132, e.g., based on iteratively receiving input from sensors and updating metadata in, or of, element representations 132 objects or other information in database 131. For example, recorded inputs from a plurality of sensors 311 that travel near elements, objects or features 320, 321, 322, 323, and 325 over a possibly long time period, may be anchored or fixed in using a common coordinate system such that accuracy, e.g., of the location of element 320 (as included in metadata of the relevant element representation 132) verified and/or is increased. For example, using the locations of sensors 311 when they sense feature 322, a set of inputs from these sensors may be correlated or brought into a common representation, e.g., a common coordinate system.

Accordingly, the set of inputs may be used for increasing accuracy of location and/or orientation of elements, thus, accuracy of location and/or orientation of a sensor provided by embodiments of the invention is increased.

In some embodiments, location and/or orientation of a 3D space may be determined by obtaining a 3D digital representation of a space using input from a mobile sensor; and determining a location and/or orientation of the space by correlating the 3D representation with a top view representation of the space. For example, sensor 311 may be a video or other camera used for capturing a set of images of a street (e.g., street view footage). The set of images may be used to create a 3D representation of a space that includes or contains the street. The 3D representation may then be correlated with a top view of the street, e.g., a satellite image.

In some embodiments, correlating a 3D representation with a top view may include projecting the 3D representation on the top view. For example, the 3D representation of the street may be projected on, aligned (or registered) with a satellite image or a road or other map in database 131. A map or image in database 131 with which a 3D representation may be correlated as described may include, or may be associated with, metadata related to elements, features or objects, e.g., metadata included in element representations 132. For example, the location (e.g., in the form of coordinate values in a global coordinate system) of elements in a map may be known. Accordingly, by correlating elements in a 3D representation with a map or other data in database 131, an embodiment may determine the exact location and/or orientation of the space in a coordinate system. For example, by projecting the 3D representation of the street on a map and aligning the 3D projection with the map, the location and orientation of the street may be determined.

As described, an embodiment may determine a location and/or orientation of a sensor in a space. In some embodiments, having determined the exact location and/or orientation of a space in a coordinate system as described, the exact location and/or orientation of a sensor in the space may be determined (e.g., by identifying elements in the space as described). For example, if the relative location of sensor 311 with respect to a number of elements in a space (e.g., house 321, pole 323 etc.) is determined as described and the location and orientation of the space are determined as described (e.g., by registering or projecting a 3D object on a map) then an embodiment may readily determine the location and/or orientation of sensor 311 in any coordinate system. Accordingly, to determine a location and/or orientation of a sensor, an embodiment may capture images around the sensor, generate a 3D representation of the space surrounding the sensor, determine the exact location and orientation of the space in a global coordinate system and, based on the (possibly relative) location and/or orientation of the sensor in the space, determine the location and/or orientation of the sensor in the global coordinate system. For example, while a vehicle is traveling through a street, an embodiment may capture images (or video footage) in the street, create a 3D representation of the street, determine the exact location and/or orientation of the street (e.g., in a global or known reference such as a map) and, based on the location and/or orientation of the vehicle in the street, determine the exact location and/or orientation of the vehicle with respect to a map or any global or common reference of choice.

In some embodiments, a 3D digital representation may be created based on a set of images and based on a relative location of at least one element in at least some of the images. For example, devices or systems such as an odometer, Inertial Measurement Unit (IMU) simultaneous localization and mapping (SLAM) system may be used to determine a relative point of view (or location and/or orientation) for some or even each of a set of images obtained as a camera or other sensor is moving through a space, e.g., traveling in a street. Using the relative point of view of a set of images, a 3D digital representation of a space may be created.

Although, for the sake of clarity and simplicity, a camera and images are mainly discussed herein, it will be understood that input from any sensor or modality may be used for determining a location and orientation of a space by correlating a 3D representation with a top view representation of the space. For example, instead of, or in addition to, a camera as described, a LIDAR or imaging radar system may be used for creating a 3D representation.

In some embodiments, a top view representation of a space includes at least one of: an aerial image, a satellite image, a structural map, a road map and a DEM. Any information or data may be used to create a top view digital representation without departing from the scope of the invention.

In some embodiments, a portion of a top view representation may be selected based on location information of the space. For example, using GPS or other means, a location or an estimation of a location of sensor 311 may be determined and a portion of a satellite image covering the area of sensor 311 may be selected for the projection of a 3D digital representation as described, such that speed and efficiency are increased and/or amount of required memory or computational resources is reduced.

As described, embodiments of the invention provide a number of advantages over known or current systems and methods. For example, a system and method may autonomously and/or automatically identify (and add to a database representations of) elements, objects or features. Moreover, a system and methods may identify (and add to a database representations of) elements, objects or features that would not be naturally, or instinctively, identified by a human. For example, to guide a friend coming to visit, one might tell the friend "make a left right after the big oak tree" since a tree is something readily identified by humans. In contrast, a system and method may identify a part of the oak's trunk as an element and add a representation of the identified part of the trunk to DB 217. For example, a part of a tree trunk identified by a LIDAR system may be an element represented by an element representation 132 since it is readily and/or accurately identified by a LIDAR system while a camera or human would have a difficulty identifying such element. For example, a human would not be able to identify a tree with a trunk that is two feet in diameter, however, an embodiment may identify the trunk's diameter with great precision, represent the trunk in DB 217 and consequently use the tree trunk for determining a location as described.

Since embodiments of the invention may identify, define (and represent in a database, e.g., in element representations 132) elements, objects or features in space based on any sensor or modality, embodiments of the invention can identify (and represent in a database and use to determine a location as described) elements, objects or features that cannot be identified by known systems and methods nor by humans. Otherwise described, while known systems and methods (and humans) rely on objects or elements such as houses or road signs, embodiments of the invention create a view of a space based on the way that any sensor or modality "sees" or "senses" space. To illustrate, the sound of a power generator picked up by a microphone cannot be used by any known system or method to determine a location, however, for some embodiments of the invention, the sound of the generator (e.g., its audio characteristics) is a perfectly legitimate feature or element that may be represented by an element representation 132 and used for determining a location as described. By creating a view of space based on how it is sensed by a variety of sensors, embodiments of the invention provide an innovative way of representing space and navigating therein.

Using machine learning or deep learning, embodiments of the invention may create a representation of an element, object or feature based on input from a first type of sensor or modality and then identify the element, object or feature based on input from a second, different type of sensor or modality. For example, using machine or deep learning, an embodiment may know, or predict the input that a LIDAR system will provide when sensing a tree trunk as described. Accordingly, provided with an image of a tree trunk, an embodiment may accurately predict the input that a LIDAR system will provide when traveling near the tree. For example, based on an image from a camera, DB 217 may include an element representation 132 describing a pole 323, based on a mapping 330 created as described, an embodiment may know, or predict, the input that a LIDAR system will provide when sensing (or traveling near) pole 323.

Accordingly, embodiments of the invention can create a representation of an element in a space based on a first type of sensor and then identify the element based on input from a second, different type of sensor without having to collect additional data, e.g., an image of pole 323 and a mapping 330 that translate elements in an image to input from a LIDAR system may suffice for OLO 233 in order to identify pole 323 based on input from a LIDAR device even though this may be the first time input from a LIDAR that senses pole 323 is ever received. Otherwise described, an embodiment may create an element representation 132 for an object in space based on input from a first sensor type (e.g., a camera) and then identify the object based on input from a second, different sensor type even if the object has never before been sensed by a sensor of the second type.

Mapping 330 may be, may be included in, or may be created based on, a model created using machine or deep learning or NN. Mapping 330 may create, define or include a mapping or link between two or more sensor types or sources of information with respect to objects, elements or features in space. Machine learning may be used, by embodiments of the invention in order to understand the connection between two or more sources of information. For example, machine learning may be used to associate input from a LIDAR system to an element representation 132 where the element representation 132 was created based on an image. For example, provided with input from a LIDAR when sensing houses 321, a system may train a model usable for translating input from LIDAR sensors such that the input is mapped to element representations related to houses 321. Otherwise described, a model may link input from LIDAR systems to input from a camera in a way that enables creating element representations 132 of houses based on images and then determining that an element sensed by a LIDAR is one that is represented by an element representation 132 created based on an image. Of course, LIDAR and camera are only some examples of modalities brought here as examples For example, mapping 330 may map input from a camera to input from a LIDAR system such that based on an image of objects such as pole 323 and features such as color change 322, input from a LIDAR system can be mapped to these objects (e.g. the input may be mapped to an element representation 132), thus, provided with an element representation 132 of pole 323 created based on an image of pole 323 (and based on data in DB 232), OLO 233 can determine presence of pole 323 based on input from a LIDAR system. Generally, element representations 132 may describe elements or objects which are fixed in time and space and using mapping 330 as described, these elements may be identified using input from any sensor. As described, element representations 132 may be automatically created based on input from any sensors and, as described, element representations 132 may describe elements or features that are not necessarily ones that are native (or even visible) to a human or camera, rather, element representations 132 may be created based on input from any sensor or modality.

It will be understood that once a mapping 330 was created for a specific modality or sensor type with respect to an object or object type, the object or object type (or instances of the object type) may be identified in any place, location or space. For example, a system may be trained to identify poles 323 based on input from a LIDAR sensing poles 323 in a first town or region (first location) and, once the training is complete, input a LIDAR system in another city or region (second location) may be identified as related to poles 323 or it may be used to determine presence of poles 323. For example, at a first step, training of a model (or creating a mapping) may be done such that input from a LIDAR system can be readily mapped to element representations 132 of poles, e.g., based on input from a LIDAR system in a first city, region or part of the world and based on knowledge of presence of poles in the region. At a next step, when mobile device 230 is located (or traveling) in another city or region, element representations 132 describing objects in the second city or region are downloaded to DB 232 and the model or mapping are also downloaded to DB 232. Next, using input from a LIDAR device in mobile device 230 and the model or mapping, OLO 233 may identify poles in the second city, e.g., identify, in DB 232, element representations 132 of nearby poles. It will be noted that OLO 233 needs not know that the identified objects are poles, all OLO 233 needs to determine is that input from a LIDAR system corresponds to an element representation 132 in DB 232, as described, this correspondence may be achieved based on a model that maps input from the LIDAR system to an element representation 132. For example, when mobile device 230 is a vehicle driven in Paris then server 210 may download to DB 232 element representations 132 that describe (or that are related to) elements, features or objects in Paris, using a model or mapping 330 as described, OLO 233 may map input from a LIDAR or any other sensor type to element representations 132 in DB 232 even though the mapping or model were created based on input from a LIDAR system located in London, of course, at least some element representations 132 related to objects in Paris need to be included in DB 217 (and downloaded to DB 232) such that they can be found by OLO 233 when traveling in Paris. For example, server 210 may update DB 217 and/or dataset 215 based on input from sensors from anywhere in the world such that element representations 132 describing objects anywhere in the world are included in DB 217 and/or dataset 215 and thus the relevant element representations 132 can be downloaded to a vehicle (mobile device 230) based on a region or area where mobile device 230 is located.

Accordingly and as described, some embodiments of the invention may include in a database representations of elements in a region or space based on input from a first sensor type or modality (e.g., a camera) and subsequently map input from a second, different sensor type or modality (e.g., a LIDAR) to the representations, accordingly, when a new sensor type or modality is added, embodiments of the invention do not need to collect information from the new sensor type in order to use input from the new sensor type, rather, input from the new sensor type may be mapped to existing element representations already included in a database. This capability greatly improves the field since it enables introducing new sensor types automatically, without having to first collect information from a new sensor. As described, using machine learning, a mapping 330 between input from a first type of sensor to input from a second type of sensor is created such that given input from the first sensor type when sensing an element an embodiment can map input from a second type of sensor to a representation of the element. For example, system 200 may automatically create a new element representation 132 object based on an image (first sensor type) of pole 232 and, using mapping 330 (or a model as described) map input from a LIDAR (second sensor type, when it senses pole 323) to the element representation 132 object that describes pole 323. By mapping input from a plurality of different sensor types or modalities to an element representation 132 object embodiments of the invention enable using any sensor type or modality to identify elements, objects or features in a space.

As further described, element representation 132 objects may be automatically created based on input from various or different sensors or modalities. An embodiment may continuously and automatically update element representation 132 objects, determine which element representations 132 are best used by different sensors or under different conditions. For example, if an embodiment determines that the color change feature 322 is not always identified then the embodiment may select to remove this feature from a databases or select not to use this feature, in another example, if an embodiment sees that house 321 is always sensed by a camera and a LIDAR then the embodiment may select to keep and use this object as described. Accordingly, embodiments of the invention may automatically and autonomously, without intervention or supervision of a human, create representations of elements in space and use the representations to determine a location as described.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of determining at least one of a location and an orientation of a sensor, the computer-implemented method comprising:
   including, in a primary database (131), representations of elements in a first space;
   using an artificial intelligence engine that produces a machine learning model adapted to extract or predict, from input obtained from (i) a first perception sensor (310) or (ii) a first modality, one or more of location indicative elements of said elements that are characteristic or defining of a geographical location or position;
   creating a mapping between (i) the representations of the elements including said one or more location indicative elements in the first space and (ii) the input from the first perception sensor or the first modality;
   utilizing, in a second space, (i) the mapping and (ii) input from a second perception sensor or a second modality that is different from the first perception sensor or the first modality, to identify one or more of the elements, including one or more of the one or more location indicative elements, whose representations are included in the database; and using attributes of the identified one or more of the elements including said one or more location indicative elements to determine at least one of a location and an orientation of the second perception sensor or the second modality in the second space;

wherein the computer-implemented method comprises:

(a) automatically and autonomously creating said mapping of said space, based on input from a set of different sensors, by automatically creating in a primary database (131) the mapping of (1) said space and (ii) elements in said space, and automatically creating element representations (132) based on input from said set of different sensors, and automatically creating mapping between (I) element representations and (II) input from said set of sensors;

wherein objects or features in said space are usable for determining a location and an orientation of a sensor;

wherein after the mapping and element representations are created, input from a sensor can be mapped to element representations, and the element representations can be used to determine the location and the orientation of the sensor;

wherein step (a) comprises:

storing in the primary database (131) a representation of an element in the first space;

creating a mapping between (1) the representation of the element, and (ii) input from the first perception sensor (310):

subsequently, using (I) said mapping and (II) input from the second perception sensor, in the second space, to locate or identify one or more elements in the primary database (131), (b) providing a positioning solution based on matching between features or objects that are captured by perception sensors to features or objects that are represented in said primary database (131), by matching between (1) an element as seen or captured from a first point-of-view, with (11) an element or feature as seen or captured from a second point-of-view;

(c) correlating between (i) representations of elements that are included in said primary database (131) based on a top-view thereof, and (ii) elements that were captured or seen using street-view images, and matching elements in a top-view with elements in a ground surface view;

(d) using auto-encoding features to learn (1) a first correlation between multiple Instances of a scene, and also (ii) a second correlation between multiple points of view, and also (iii) a third correlation between representations of a scene by a plurality of modalities;

(e) using Machine Learning, creating a representation of an object based on input from a first type of sensor, and then identifying said object based on input from a second, different, type of sensor.

2. The computer-implemented method according to claim 1, comprising:

based on an estimation of a location of a vehicle, downloading some of the element representations (132) from said primary database (131) to a vehicular database (232) of a specific vehicle (230), wherein the vehicular database (232) of the specific vehicle (230) only downloads from the primary database (131) and stores element representations (132) that describe elements that are physically located near the specific vehicle (230).

3. The computer-implemented method according to claim 1, comprising:

at a localization Artificial Intelligence engine (220), training a Machine Learning model (221), by (i) receiving, at the localization Artificial Intelligence engine (220), from a dataset (215), data that includes images;

wherein each data element (218) of said dataset (215) is associated with a geographical position and/or orientation;

(ii) receiving, at the localization Artificial Intelligence engine (220), data originating from a camera and data originating from a LIDAR sensor;

(iii) training, at the localization Artificial Intelligence engine (220), a Machine Learning model corresponding to data included in said dataset (215), and producing a Machine Learning model corresponding to a second type of data that originated from one or more sensors.

4. The computer-implemented method according to claim 3, comprising:

(I) at the localization Artificial Intelligence engine (220), producing a Machine Learning model that is adapted to receive an input data element of a specific type of sensor;

wherein the Machine Learning model is adapted to predict, from said received input data element, a location-indicative element (320) which is a characteristic of a geographical location;

wherein the location-indicative element is unintelligible or incoherent to a human observer, and does not pertain to any specific physical object, and is a produce of the Machine Learning model (221) that can be recognized by the localization Artificial Intelligence engine (220) as indicative of geographical locations;

(II) based on the Machine Learning model (221), producing, from an incoming data element, at least one road code (250) that is associated with said location-indicative element.

5. The computer-implemented method according to claim 1, comprising:

adapting a radar to sense an object, and to output a data element corresponding to the sensed object;

producing, by said radar, signals or data elements that correspond to a set of values or readings that represent a frequency or an amplitude or other attributes of reflected Radio Frequency radiation or electromagnetic waves;

mapping said set of values to an element representation object;

subsequently, when the set of values is received by another radar, mapping the set of values to said element representation object.

6. The computer-implemented method according to claim 1, wherein said mapping comprises generating a signature based on a set of values received from a sensor;

wherein the method comprises:

utilizing said signature as a key for finding the correct element representation object in the vehicular database (232), by performing, at an Onboard Localization and Orientation Unit (233):

(i) examining input from a sensor, (ii) producing a signature based on the input from the sensor, (iii) using said signature to find an element representation object in the vehicular database (232) of the specific vehicle (230);

(iv) once the element representation object is found, extracting location attributes of the element from the element representation object.

7. The computer-implemented method according to claim 1, comprising:

creating a first mapping according to a first condition, and creating a second mapping according to a second condition, and selecting to use one of the first mapping and the second mapping according to a condition.

8. The computer-implemented method according to claim 7, wherein the first condition is day time, wherein the second condition is night time.

9. The computer-implemented method according to claim 7, wherein the first condition is a rainy day, wherein the second condition is a sunny day.

10. The computer-implemented method according to claim 1, comprising:

classifying element representations according to a condition, wherein elements that are best detected at night are associated with a first class, wherein elements that are best detected in sunlight are associated with a second class.

11. The computer-implemented method according to claim 1, comprising, comprising:

automatically selecting a set of elements to be used for determining location and/or orientation, based on a condition;

wherein, if it rains when location of a sensor (311) is to be determined, then selecting a set of elements that are classified as best for poor visibility for determining location and/or orientation of said sensor (311).

12. The computer-implemented method according to claim 1, comprising:

classifying element representations according to a suitability for sensor type, wherein a first class of elements is suitable for use with a camera, wherein a second class of elements is suitable for use with a LIDAR sensor.

13. The computer-implemented method according to claim 1, comprising:

creating a plurality of mappings (330) for a respective plurality of sensor types; and determining location and orientation of a sensor by selecting one of the plurality of mappings (330) based on the type of the sensor.

14. The computer-implemented method according to claim 1, comprising:

(i) creating a plurality of mappings (330) for a respective plurality of sensor types;

(ii) dynamically selecting a mapping to be used, based on the type of sensor for which location and/or orientation are determined;

(iii) automatically selecting a subset of elements in the primary database (131), wherein the subset is selected based on the type of the sensor;

(iv) selecting mappings and element representations by selecting the set of element representations (132) and mappings (330) that are downloaded to the vehicular database (232) of said specific vehicle (230) and are the optimal set for the sensor used;

wherein the computer-implemented method comprises:

selecting a subset of element representations (132) and mappings (330) based on: (I) sensor type, and (II) suitability of the sensor to sense specific elements, and (III) a condition;

if input from the sensor cannot be mapped to any element representation (132), then:

creating in the primary database (131) a new element representation (132).

15. The computer-implemented method according to claim 1, comprising:

encoding (i) data received from a plurality of sensor types, to (ii) a unified format representation to be included in said primary database (131); and by encoding different data types coming from different sensor types into a unified format representation, representing a single element in space based on input from a plurality of different modalities.

16. A non-transitory storage medium having stored thereon instructions that, when executed by a machine, cause the machine to perform a method comprising:

including, in a primary database (131), representations of elements in a first space;

using an artificial intelligence engine that produces a machine learning model adapted to extract or predict, from input obtained from (i) a first perception sensor (310) or (ii) a first modality, one or more of location indicative elements of said elements that are characteristic or defining of a geographical location or position;

creating a mapping between (i) the representations of the elements including said one or more location indicative elements in the first space and (ii) the input from the first perception sensor or the first modality;

utilizing, in a second space, (i) the mapping and (ii) input from a second perception sensor or a second modality that is different from the first perception sensor or the first modality, to identify one or more of the elements, including one or more of the one or more location indicative elements, whose representations are included in the database; and using attributes of the identified one or more of the elements including said one or more location indicative elements to determine at least one of a location and an orientation of the second perception sensor or the second modality in the second space;

wherein the method comprises:

(a) automatically and autonomously creating said mapping of said space, based on input from a set of different sensors, by automatically creating in a primary database (131) the mapping of (i) said space and (ii) elements in said space, and automatically creating element representations (132) based on input from said set of different sensors, and automatically creating mapping between (I) element representations and (II) input from said set of sensors;

wherein objects or features in said space are usable for determining a location and an orientation of a sensor;

wherein after the mapping and element representations are created, input from a sensor can be mapped to element representations, and the element representations can be used to determine the location and the orientation of the sensor;

wherein step (a) comprises:

storing in the primary database (131) a representation of an element in the first space;

creating a mapping between (i) the representation of the element, and (ii) input from the first perception sensor (310);

subsequently, using (I) said mapping and (II) input from the second perception sensor, in a the second space, to locate or identify one or more elements in the primary database (131) (b) providing a positioning solution based on matching between features or objects that are captured by perception sensors to features or objects that are represented in said primary database (131), by matching between (i) an element as seen or captured from a first point-of-view, with (ii) an element or feature as seen or captured from a second point-of-view;

(c) correlating between (i) representations of elements that are included in said primary database (131) based on a top-view thereof, and (ii) elements that were captured or seen using street-view images, and matching elements in a top-view with elements in a ground surface view;

(d) using auto-encoding features to learn (i) a first correlation between multiple instances of a scene, and also (ii) a second correlation between multiple points of view, and also (iii) a third correlation between representations of a scene by a plurality of modalities;

(e) using Machine Learning, creating a representation of an object based on input from a first type of sensor, and then identifying said object based on input from a second, different, type of sensor.

17. A system comprising:

one or more hardware processors that are configured to execute code, and that are operably associated with a memory unit that is configured to store code and data, wherein the one or more hardware processors are configured to perform a method comprising:

including, in a primary database (131), representations of elements in a first space;

using an artificial intelligence engine that produces a machine learning model adapted to extract or predict, from input obtained from (i) a first perception sensor (310) or (ii) a first modality, one or more of location indicative elements of said elements that are characteristic or defining of a geographical location or position;

creating a mapping between (i) the representations of the elements including said one or more location indicative elements in the first space and (ii) the input from the first perception sensor or the first modality;

utilizing, in a second space, (i) the mapping and (ii) input from a second perception sensor or a second modality that is different from the first perception sensor or the first modality, to identify one or more of the elements, including one or more of the one or more location indicative elements, whose representations are included in the database; and using attributes of the identified one or more of the elements including said one or more location indicative elements to determine at least one of a location and an orientation of the second perception sensor or the second modality in the second space;

wherein the method comprises:

(a) automatically and autonomously creating said mapping of said space, based on input from a set of different sensors, by automatically creating in a primary database (131) the mapping of (i) said space and (ii) elements in said space, and automatically creating element representations (132) based on input from said set of different sensors, and automatically creating mapping between (I) element representations and (II) input from said set of sensors;

wherein objects or features in said space are usable for determining a location and an orientation of a sensor;

wherein after the mapping and element representations are created, input from a sensor can be mapped to element representations, and the element representations can be used to determine the location and the orientation of the sensor;

wherein step (a) comprises:

storing in the primary database (131) a representation of an element in the first space;

creating a mapping between (i) the representation of the element, and (ii) input from the first perception sensor (310);

subsequently, using (I) said mapping and (II) input from the second perception sensor, in the second space, to locate or identify one or more elements in the primary database (131), (b) providing a positioning solution based on matching between features or objects that are captured by perception sensors to features or objects that are represented in said primary database (131), by matching between (i) an element as seen or captured from a first point-of-view, with (ii) an element or feature as seen or captured from a second point-of-view;

(c) correlating between (i) representations of elements that are included in said primary database (131) based on a top-view thereof, and (ii) elements that were captured or seen using street-view images, and matching elements in a top-view with elements in a ground surface view;

(d) using auto-encoding features to learn (i) a first correlation between multiple instances of a scene, and also (ii) a second correlation between multiple points of view, and also (iii) a third correlation between representations of a scene by a plurality of modalities;

(e) using Machine Learning, creating a representation of an object based on input from a first type of sensor, and then identifying said object based on input from a second, different, type of sensor.

* * * * *